June 16, 1925.
J. D. BENBOW
RAILWAY DUMP CAR
Filed July 3, 1924
1,541,784
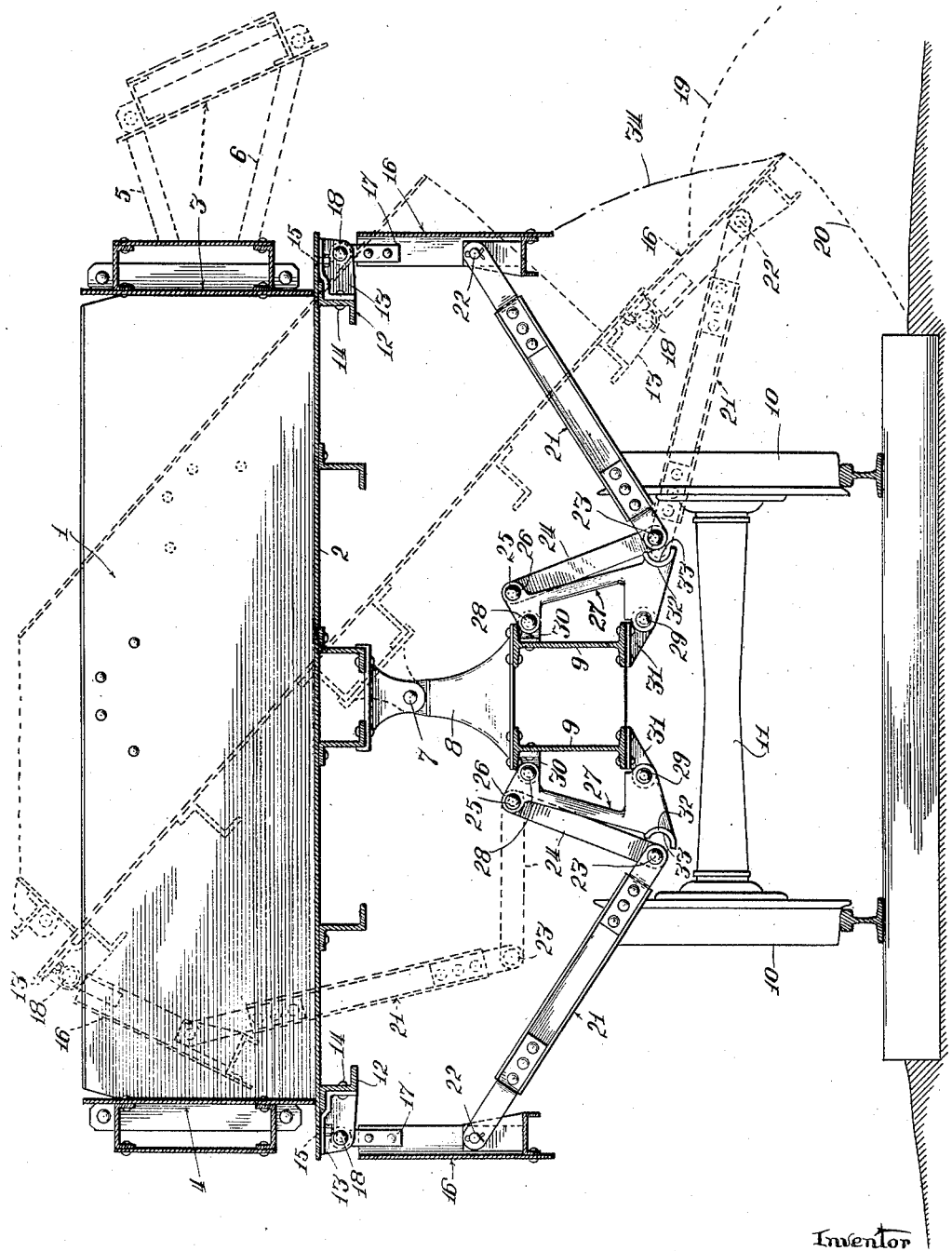

Patented June 16, 1925.

1,541,784

UNITED STATES PATENT OFFICE.

JAMES D. BENBOW, OF AURORA, ILLINOIS, ASSIGNOR TO WESTERN WHEELED SCRAPER COMPANY, OF AURORA, ILLINOIS, A CORPORATION OF ILLINOIS.

RAILWAY DUMP CAR.

Application filed July 3, 1924. Serial No. 723,959.

*To all whom it may concern:*

Be it known that I, JAMES D. BENBOW, a citizen of the United States, and a resident of Aurora, in the county of Kane and State of Illinois, have invented certain new and useful Improvements in Railway Dump Cars, of which the following is a specification, reference being had to the accompanying drawing.

My invention relates to railway dump cars of the type in which the car bed is arranged to be tilted to one side or the other of the track to discharge its load. Usually such cars are designed to dump at either side, and are provided with side gates which close the sides of the bed when it is in its operative position, and when it is tilted the gate at the discharge side is automatically lifted or held up out of the way to permit the load to discharge freely.

Heretofore it has been proposed to provide such dump cars with side aprons or extension pieces disposed along the side margins of the floor of the bed and hinged thereto so that they may be swung laterally to form extensions of the floor to throw the material being unloaded out far enough from the track so that it is not deposited on the ballasting. When the track is in its normal position the side aprons are withdrawn so that they do not project beyond the side margins of the bed, and assume a substantially vertical position. A dump car of this type is shown and described in Letters Patent to Thomas R. McKnight, No. 888,526, dated May 26, 1908, and the object of my present invention is to provide certain improvements in such cars, the nature of which will be hereinafter pointed out. What I regard as new is set forth in the claims.

In the accompanying drawing, in which I have illustrated only such parts of a dump car as are necessary to an understanding of my invention, the figure is a vertical cross-section of a dump car to which my improvements are applied, showing the normal position of the parts in full lines, and in dotted lines their position when the bed has been tilted to discharge the load to the right.

Referring to the drawings,—1 indicates the car bed as a whole, 2 the floor thereof, and 3, 4 the side gates. All these parts are preferably made of steel, and are made according to a design well known commercially. The side gates are mounted by means of straps 5, 6 connected with their upper and lower marginal portions and with the ends of the bed, and are equipped with any suitable means by which, when the bed is tilted, the side gate at the low side will be held up out of the way, as indicated by dotted lines in the drawing. An arrangement suitable for this purpose is shown in said McKnight patent.

The bed is pivotally mounted under its longitudinal center line on a series of pivots 7 arranged at suitable intervals and supported by standards 8 mounted on the center sill of the under body of the car, which is preferably composed of two I-beams 9. This center sill is supported in the usual way on four wheeled trucks of standard design, 10 indicating the wheels and 11 the axle thereof. The usual bolsters are not shown, as the illustration thereof is believed to be unnecessary.

Secured to the under side of the bed and extending longitudinally thereof a short distance back of the side margins of the floor 2 thereof, are two side sills comprising Z-bars 12 which not only reinforce the bottom of the bed, but also serve as supports for brackets 13 disposed transversely of the car immediately under the side margins of the floor 2. These brackets, a number of which are provided at suitable intervals from one end of the car to the other, are preferably secured to the Z-bars 12 by rivets 14 and are bolted to the marginal portions of the floor 2 by bolts 15, the heads of which are counter-sunk in the floor so that they do not project above the level thereof. The purpose of connecting these brackets to the bed in this manner is to facilitate replacement of the floor when necessary without disturbing said brackets. Suspended from the brackets 13 are side aprons 16 which are connected thereto by hangers 17 secured to the upper side margins of the aprons and pivotally connected by pivots 18 with the brackets 13, so that the side gates may swing freely laterally. The arrangement of these parts is such that when either apron 16 is turned into a position of substantial alinement with the floor of the bed, as indicated by dotted lines in the drawing, its inner or upper margin will move slightly under the adjacent margin of the floor, thereby providing a continuous surface which preferably, though not necessarily, lies in the same plane as the floor of the car bed, over which the material being discharged may flow. The effect is to widen the floor of the bed at the discharge side, so that the material is deposited far enough from the track so that it will not fall on the ballasting of the road-bed. In the drawing the dotted line 19 indicates approximately the form assumed by the top of the heap of material discharged before the car bed is righted, and the dotted line 20 indicates the angle of repose of such heap of material at the side next to the road-bed.

For moving the apron 16 out to the position indicated in dotted lines, and holding it there when the bed is tilted, I provide one or more vertically swinging thrust bars 21 disposed at suitable intervals along the car, the thrust bars at each side thereof having their outer ends connected with the adjacent apron 16 at points between the side margins thereof by pivots 22, and their inner ends connected by pivots 23 with the lower ends of links 24. The upper ends of said links are connected by pivots 25 with outwardly projecting ears 26 carried by brackets 27 which are fixedly secured by rivets 28, 29 to brackets 30, 31 attached to the upper and lower portions of the I-beams 9. The brackets 27 are provided with abutments 32 at their lower outer corners, in each of which is a concave recess 33 adapted to receive the rounded inner end portion of the adjacent thrust bar 21, as indicated by dotted lines in the drawing. The length of the links 24 is such that the arc through which the inner ends of said thrust bars swing intersects the centers of said concave recesses. The brackets 30, 31 are intended to be permanently attached to the center sill members of the car so that they may be made standard equipment, and the brackets 13 may also be standard equipment. The side aprons and their operating connections, including the brackets 27, may then be readily attached to such cars as special equipment, and may easily be removed should replacement be necessary. Also, this construction lends itself readily to the attachment of my improved side aprons to old cars, as the necessary brackets for attaching such side aprons, and the brackets 27, may easily be applied to many of such old cars. In this connection it should be remarked that while I have shown my improvements applied to a car arranged to dump at either side, they may be applied to one-way dump cars, and the claims hereinafter made are therefore to be construed accordingly.

It will be noted that when the car bed is in its normal position the side aprons 16 hang pendent from the pivots 18, and the inner ends of the thrust bars 21 are removed a short distance from the abutments 32. The purpose of this arrangement is to permit the car bed to rock slightly, as car beds usually do when the load is being transported, without causing the side aprons to swing outwardly beyond the side margins of the car. When, however, the bed is tilted to discharge its load, the downward movement of the side of the bed at the discharge side will cause the thrust bars 21 at that side to rock about the pivots 23, and also to move inwardly endwise into contact with the abutments 32, when their further inward movement is arrested. Their outer ends continue to swing downward about the pivots 23, thereby swinging the lower margin of the apron to which they are attached outwardly until ultimately the parts assume the position shown in dotted lines in the drawing. The approximate course pursued by the lower margin of the side apron is indicated by the dotted line 34 in the drawing. This course is determined by the thrust bars 21, which, as above stated, are connected with the side apron at points between the side margins thereof, so that the outer or lower marginal portion of the apron will swing inward, more or less, as the inner or upper margin thereof is carried upward and outward in the righting operation by reason of its connection with the car body, the effect being to rock the apron about the pivots 22 in a clockwise direction as seen at the right hand side of the illustration. It will be noted that when the bed is fully tilted the load to some extent overlaps the apron, and therefore if the apron were held in substantial alinement with the floor of the bed during the righting operation that part of the load would resist righting of the bed, and while this would not seriously interfere with the righting operation, inasmuch as in cars of this type that is performed by air pressure, to economize power it is desirable that no more load be imposed on the aprons during the righting operation than is really necessary. Therefore the construction shown and described is a desirable one, because, as indicated by the dotted line 34, when the bed is being righted the lower margin of the apron does not swing outward in an arc of which the pivots 7 are at the center, but follows a path inwardly inclined from the vertical, particularly while under the load. Consequently, it is to some extent withdrawn from the overlying load, although it sweeps some of it laterally away from the track, thereby shifting the ridge of the dumped material outwardly. A small part of such material may fall along the dotted line 20, but not enough to reach to the ballasting.

The links 24 serve to guide the inner ends of the thrust bars 21 and hold them in proper relation to the abutments 32, so that when the side aprons are hanging pendent and the car bed is in its normal position the inner ends of said thrust bars are out of contact with said abutments. Therefore the car bed may rock slightly under the motion of the car when a load is being transported without causing the side aprons to be thrust out beyond their side margins. This is an important feature of my invention, as it frequently happens that there are places along a railway track where there is not much room for clearance, and should the aprons be moved outward so as to project laterally beyond the side margins of the bed, they might strike objects near the track and thereby cause serious damage. My improved construction, therefore, makes practicable the use of wider side aprons than would otherwise be compatible with safety. When, however, the car bed is tilted to dump its load, the inner ends of the thrust bars 21 at the dumping side move into the concave recesses 33 and rock in them as bearings, while the outer ends of said thrust bars move the apron with which they are connected out in line with the floor of the bed, as above described. The links 24 also serve to permit the thrust bars 21 at the opposite side of the car to move upward when the bed is being dumped, as illustrated by the dotted lines at the left in the drawing.

It will be understood that the number of thrust bars provided depends on the length of the car, one or more being used as may be best calculated to secure efficient operation. The claims hereinafter made are therefore to be construed accordingly.

What I claim as my invention and desire to secure by Letters Patent, is—

1. In a dump car, the combination with a car bed mounted to tilt laterally to discharge its load, of a side apron pivotally suspended along a side margin of the bed and adapted to be projected into position to form a lateral extension of the floor thereof, and swinging means actuated by the tilting of the bed to discharge its load to project said apron into operative position and arranged to permit limited rocking of the bed without projecting said apron.

2. In a dump car, the combination with a car bed mounted to tilt laterally to discharge its load, of a side apron pivotally suspended along a side margin of the bed and adapted to be projected into position to form a lateral extension of the floor thereof, and means connected with said apron and with the under body of the car and actuated by the tilting of the bed to discharge its load to project said apron into operative position, said means being arranged to permit limited rocking of the bed without projecting said apron.

3. In a dump car, the combination with a car bed mounted to tilt laterally to discharge its load, of a side apron pivotally suspended along a side margin of the bed and adapted to be projected into position to form a lateral extension of the floor thereof, and means interposed between said apron and the under body of the car, and operating on the tilting of the bed to discharge its load to project said apron into operative position, and to cause the lower margin of the apron initially to move inwardly in the righting operation.

4. In a dump car, the combination with a car bed mounted to tilt laterally to discharge its load, of a side apron pivotally suspended along a side margin of the bed and adapted to be projected into position to form a lateral extension of the floor thereof, and means connected with said apron and with the under body of the car, and operating on the tilting of the bed to discharge its load to project said apron into operative position, and to initially move the lower margin of the apron inwardly in the righting operation.

5. In a dump car, the combination with a car bed mounted to tilt laterally to discharge its load, of a side apron pivotally suspended along a side margin of the bed and adapted to be projected into position to form a lateral extension of the floor thereof, and means interposed between the apron and the under body of the car and connected with said apron between its side margins, for projecting the apron into operative position when the bed is dumped, and preventing outward movement of the lower margin of the apron in the righting operation.

6. In a dump car, the combination with a car bed mounted to tilt laterally to discharge its load, of a side apron pivotally suspended along a side margin of the bed and adapted to be projected into position to form a lateral extension of the floor thereof, and means pivotally connected with the apron between its side margins, and with the under body of the car, and operating to project the apron when the bed is dumped, and to cause the lower margin of the apron to move inwardly initially when the bed is being righted.

7. In a dump car, the combination with a car bed mounted to tilt laterally to discharge its load, of a side apron pivotally suspended along a side margin of the bed and adapted to be projected into position to form a lateral extension of the floor thereof, and means for projecting said apron into operative position comprising a pivoted thrust bar interposed between said apron and the under body of the car and operating when the bed is tilted to discharge its load to move the lower portion of said apron outwardly, said thrust bar being inoperative to project said apron when the car bed rocks normally in transporting the load.

8. In a dump car, the combination with a car bed mounted to tilt laterally to discharge its load, of a side apron pivotally suspended along a side margin of the bed and adapted to be projected into position to form a lateral extension of the floor thereof, and a thrust bar interposed between the apron and the under body of the car and arranged to pivotally support the apron between the side margins thereof when the bed is being righted to cause the lower margin of the apron to move initially inwardly relatively to the upper margin thereof when righting.

9. In a dump car, the combination with a car bed mounted to tilt laterally to discharge its load, of a side apron pivotally suspended along a side margin of the bed and adapted to be projected into position to form a lateral extension of the floor thereof, and vertically swinging means interposed between the apron and the under body of the car and arranged to pivotally support the apron between the side margins thereof when the bed is being righted to cause the lower margin of the apron to move initially inwardly relatively to the upper margin thereof when righting.

10. In a dump car, the combination with a car bed mounted to tilt laterally to discharge its load, of a side apron pivotally suspended along a side margin of the bed and adapted to be projected into position to form a lateral extension of the floor thereof, and a vertically swinging thrust bar pivotally connected with the under body of the car and with said apron between the side margins thereof to cause the lower margin of the apron to move initially inwardly relatively to the upper margin thereof when righting.

11. In a dump car, the combination with a car bed mounted to tilt laterally to discharge its load, of a side apron pivotally suspended along a side margin of the bed and adapted to be projected into position to form a lateral extension of the floor thereof, and means for projecting said apron into operative position comprising thrust bars interposed between said apron and the under body of the car, the outer ends of said thrust bars being pivotally connected with said apron and the inner ends thereof being normally out of operative engagement with said under body and being arranged to be moved into operative engagement therewith by the tilting of the bed to discharge its load.

12. In a dump car, the combination with a car bed mounted to tilt laterally to discharge its load, of a side apron pivotally suspended along a side margin of the bed and adapted to be projected into position to form a lateral extension of the floor thereof, means for projecting said apron into operative position comprising thrust bars interposed between said apron and the under body of the car, the outer ends of said thrust bars being pivotally connected with said apron, links pivotally connected at their upper ends with said under body of the car and at their lower ends with said thrust bars, and abutments carried by the under body and cooperating with the inner ends of said thrust bars, said thrust bars being normally out of engagement with said abutments and being movable into engagement therewith by the tilting of the bed to discharge its load.

13. In a dump car, the combination with a car bed mounted to tilt laterally to discharge its load, of a side apron pivotally suspended along a side margin of the bed and adapted to be projected into position to form a lateral extension of the floor thereof, means for projecting said apron into operative position comprising thrust bars interposed between said apron and the under body of the car, the outer ends of said thrust bars being pivotally connected with said apron, links pivotally connected at their lower ends with the inner end portions of said thrust bars, brackets secured to the under body of the car, the upper end portions of said links being pivotally connected with said brackets, and abutments on said brackets adapted to be engaged by the inner ends of said thrust bars.

14. In a dump car, the combination with a car bed mounted to tilt laterally to discharge its load, of a side apron pivotally suspended along a side margin of the bed and adapted to be projected into position to form a lateral extension of the floor thereof, means for projecting said apron into operative position comprising thrust bars interposed between said apron and the under body of the car, the outer ends of said thrust bars being pivotally connected with said apron, links pivotally connected at their lower ends with the inner end portions of said thrust bars, brackets secured to the under body of the car, the upper end portions of said links being pivotally connected with said brackets, and abutments on said brackets adapted to be engaged by the inner ends of said thrust bars, said thrust bars being normally out of engagement with said abutments and being movable into engagement therewith by the tilting of the bed to discharge its load.

15. In a dump car, the combination with a car bed mounted to tilt laterally to discharge its load, of a side apron pivotally suspended along a side margin of the bed to swing laterally and adapted to be projected into position to form a lateral extension of the floor thereof, and means for projecting said apron into operative position comprising thrust bars pivotally connected at their outer ends with said apron, brackets secured to the under body of the car and forming abutments for the inner end portions of said thrust bars, and means for supporting the inner end portions of said thrust bars.

16. In a dump car, the combination with a car bed mounted to tilt laterally to discharge its load, and brackets secured to said bed near its side margins, of a side apron pivotally suspended from said brackets to swing laterally and adapted to be projected into position to form a lateral extension of the floor of said bed, and means for projecting said apron into operative position comprising thrust bars pivotally connected at their outer ends with said apron, links pivotally connected with the inner end portions of said thrust bars, brackets secured to the under body of the car and pivotally connected with the upper ends of said links, the latter brackets being arranged to form abutments for the inner end portions of said thrust bars.

JAMES D. BENBOW.